US009514735B2

(12) United States Patent
Seo et al.

(10) Patent No.: US 9,514,735 B2
(45) Date of Patent: Dec. 6, 2016

(54) WATERPROOF SOUND TRANSMITTING SHEET, AND METHOD FOR PRODUCING SAME

(71) Applicant: Amogreentech Co., Ltd., Gyeonggi-do (KR)

(72) Inventors: In-Yong Seo, Seoul (KR); Seung-Hoon Lee, Gyeonggi-do (KR); Jun-Sik Hwang, Incheon (KR); Yong-Sik Jung, Gyeonggi-do (KR); Kyung-Su Kim, Gyeonggi-do (KR)

(73) Assignee: Amogreentech Co., Ltd., Gyeonggi-Do (KR)

( * ) Notice: Subject to any disclaimer, the term of this patent is extended or adjusted under 35 U.S.C. 154(b) by 25 days.

(21) Appl. No.: 14/371,648

(22) PCT Filed: Dec. 11, 2013

(86) PCT No.: PCT/KR2013/011497
§ 371 (c)(1),
(2) Date: Jul. 10, 2014

(87) PCT Pub. No.: WO2014/092462
PCT Pub. Date: Jun. 19, 2014

(65) Prior Publication Data
US 2014/0332310 A1    Nov. 13, 2014

(30) Foreign Application Priority Data

Dec. 11, 2012   (KR) .................. 10-2012-0143372
Dec. 11, 2013   (KR) .................. 10-2013-0154025

(51) Int. Cl.
*H04R 1/08*         (2006.01)
*H04R 1/10*         (2006.01)
(Continued)

(52) U.S. Cl.
CPC .............. *G10K 11/18* (2013.01); *B32B 5/022* (2013.01); *B32B 5/028* (2013.01); *B32B 5/22* (2013.01);
(Continued)

(58) Field of Classification Search
CPC .. H04R 1/086; H04R 1/023; H04R 2410/07; G10K 11/18; D01D 5/0007; D01D 5/0023; D01D 5/003
USPC ........ 181/211, 126, 128, 129; 381/325, 334, 381/359
See application file for complete search history.

(56) References Cited

U.S. PATENT DOCUMENTS 4,071,040 A * 1/1978 Moriarty ................. H04M 1/03
                                                              137/199
4,987,597 A * 1/1991 Haertl ................. H04R 25/654
                                                              381/325
(Continued)

FOREIGN PATENT DOCUMENTS

CN      101263733       9/2008
JP      10165787 A *   6/1998
(Continued)

OTHER PUBLICATIONS

Office Action of Japanese Patent Office dated Jul. 28, 2015; in Appln. No. 2014-552144.

*Primary Examiner* — Edgardo San Martin
(74) *Attorney, Agent, or Firm* — Baker & Hostetler LLP

(57) ABSTRACT

Disclosed herein is a waterproof sound-transmitting sheet, the thickness of which can easily be adjusted and which has a high sound transmitting efficiency and excellent waterproofness, and a method for producing same. The waterproof sound-transmitting sheet, which is attached to a sound hole of a case, includes: a support layer made of a film-shaped porous material and formed in the case; and a waterproofing layer formed on one side of the support layer in the shape of a porous nanoweb in which fine fiber strands are crosswisely layered and exposed to the outside of the case.

4 Claims, 3 Drawing Sheets

(51) Int. Cl.

| | | |
|---|---|---|
| *G10K 11/18* | (2006.01) | |
| *D01D 5/06* | (2006.01) | |
| *D01D 5/08* | (2006.01) | |
| *H04R 1/00* | (2006.01) | |
| *B32B 37/02* | (2006.01) | |
| *B32B 5/02* | (2006.01) | |
| *B32B 5/24* | (2006.01) | |
| *B32B 27/12* | (2006.01) | |
| *B32B 27/30* | (2006.01) | |
| *B32B 27/32* | (2006.01) | |
| *B32B 5/22* | (2006.01) | |
| *B32B 7/12* | (2006.01) | |
| *B32B 27/20* | (2006.01) | |
| *H04R 1/02* | (2006.01) | |
| *D01D 5/00* | (2006.01) | |
| *B32B 37/24* | (2006.01) | |

(52) U.S. Cl.
CPC . *B32B 5/24* (2013.01); *B32B 7/12* (2013.01); *B32B 27/12* (2013.01); *B32B 27/20* (2013.01); *B32B 27/304* (2013.01); *B32B 27/322* (2013.01); *B32B 37/02* (2013.01); *H04R 1/00* (2013.01); *H04R 1/023* (2013.01); *B32B 2037/243* (2013.01); *B32B 2250/03* (2013.01); *B32B 2250/24* (2013.01); *B32B 2250/40* (2013.01); *B32B 2255/02* (2013.01); *B32B 2255/26* (2013.01); *B32B 2307/10* (2013.01); *B32B 2307/724* (2013.01); *B32B 2307/7265* (2013.01); *B32B 2307/73* (2013.01); *B32B 2457/00* (2013.01); *H04R 2499/00* (2013.01)

(56) References Cited

U.S. PATENT DOCUMENTS

| | | | |
|---|---|---|---|
| 5,186,996 A | 2/1993 | Alts | |
| 5,342,434 A * | 8/1994 | Wu | A41D 31/0011 428/308.4 |
| 5,460,872 A * | 10/1995 | Wu | B01D 39/1692 428/304.4 |
| 5,462,586 A * | 10/1995 | Sugiyama | B01D 39/083 55/524 |
| 5,814,405 A * | 9/1998 | Branca | B01D 39/1692 264/127 |
| 5,828,012 A * | 10/1998 | Repolle | H04R 1/023 181/175 |
| 6,512,834 B1 * | 1/2003 | Banter | H04R 1/086 381/189 |
| 6,932,187 B2 * | 8/2005 | Banter | H04R 1/086 181/149 |
| 7,702,124 B2 * | 4/2010 | Niederdraenk | H04R 1/086 381/322 |
| 7,771,818 B2 * | 8/2010 | Klare | C08J 5/2293 210/500.21 |
| 7,927,405 B2 * | 4/2011 | Bacino | B01D 46/54 210/640 |
| 8,141,678 B2 * | 3/2012 | Ikeyama | C09J 7/0282 181/167 |
| 8,157,048 B2 * | 4/2012 | Banter | H04R 1/023 181/149 |
| 8,272,517 B2 * | 9/2012 | Horie | B32B 5/32 156/229 |
| 8,685,198 B2 * | 4/2014 | Mietta | B32B 3/266 156/291 |
| 8,731,618 B2 * | 5/2014 | Jarvis | F16F 1/027 267/164 |
| 8,739,926 B1 * | 6/2014 | Mori | G10K 11/18 181/286 |
| 8,846,161 B2 * | 9/2014 | Linford | B05D 1/36 427/535 |
| 9,038,773 B2 * | 5/2015 | Banter | G10K 11/002 181/286 |
| 9,044,706 B2 * | 6/2015 | Furuyama | B01D 39/1692 |
| 2006/0019099 A1 | 1/2006 | Wang et al. | |
| 2009/0176056 A1 * | 7/2009 | Marin | A41D 31/02 428/141 |
| 2010/0247857 A1 * | 9/2010 | Sanami | H04M 1/18 428/138 |
| 2011/0209265 A1 * | 9/2011 | Komada | A42B 1/048 2/202 |
| 2013/0083528 A1 * | 4/2013 | Huang | B32B 27/065 362/249.01 |
| 2013/0084447 A1 * | 4/2013 | Shimatani | B01D 69/02 428/220 |
| 2015/0001000 A1 * | 1/2015 | Seo | G10K 11/18 181/211 |
| 2015/0070842 A1 * | 3/2015 | Lee | D01D 5/0038 361/692 |

FOREIGN PATENT DOCUMENTS

| | | |
|---|---|---|
| JP | 2002-502561 | 1/2002 |
| JP | 2009-137181 | 6/2009 |
| JP | 2009-279930 | 12/2009 |
| JP | 2010-0247547 | 11/2010 |
| KR | 10-2008-0035101 | 4/2008 |
| KR | 10-2008-0064832 | 7/2008 |
| KR | 10-2009-0128104 | 12/2009 |
| KR | 10-2010-0024119 | 3/2010 |
| KR | 10-2010-0041839 | 4/2010 |
| KR | 10-2011-0058026 | 6/2011 |
| KR | 10-2011-0063492 | 6/2011 |
| KR | 10-2011-0074869 | 7/2011 |
| KR | 10-2011-0095753 | 8/2011 |

\* cited by examiner

WATERPROOF SOUND TRANSMITTING SHEET, AND METHOD FOR PRODUCING SAME

CROSS-REFERENCE TO RELATED APPLICATIONS

This application is the National Stage of International Application No. PCT/KR2013/011497, filed Dec. 11, 2013, which claims the benefit of and priority to Korean application No. 10-2012-0143372, filed Dec. 11, 2012 and Korean application No. 10-2013-0154025, filed Dec. 11, 2013, the entireties of which applications are incorporated herein by reference for any and all purposes.

TECHNICAL FIELD

The present invention relates to a waterproof sound-transmitting sheet and a method for producing same. More particularly, the present invention relates to a waterproof sound-transmitting sheet, the thickness of which can be easily adjusted and which has a high sound transmitting efficiency and excellent waterproofness, and a method for producing same. This application claims the benefits of Korean Patent Application No. 10-2012-0143372, filed on Dec. 11, 2012, and Korean Patent Application No. 10-2013-0154025, filed on Dec. 11, 2013, which are hereby incorporated by reference in its entirety into this application.

BACKGROUND ART

Recently, mobile electronic appliances, such as portable terminals, digital cameras and notebooks, have increasingly been used. Such a mobile electronic appliance needs to have a waterproofing property because it is used while being carried. However, such a mobile electronic appliance is configured such that a sound hole is formed in its portion to be provided with a speaker or microphone, and water or dust infiltrates into the mobile electronic appliance through the sound hole.

Therefore, the sound hole is provided therein with a waterproof sound-transmitting sheet for transmitting sound and blocking water or dust. Such a waterproof sound-transmitting sheet must be produced in consideration of both a waterproofing property and a sound transmitting efficiency.

In relation thereto, Korean Patent Application Publication No. 10-2010-0041839 (Apr. 22, 2010) discloses a waterproof sound-transmitting sheet made of a porous polytetrafluoroethylene film. However, this conventional waterproof sound-transmitting sheet is problematic in that, since it is composed of only a porous polytetrafluoroethylene film, the micropores of the porous polytetrafluoroethylene film are enlarged by externally-applied impact or sound pressure depending on the increase in the period of sheet usage, thus deteriorating the waterproofing performance thereof.

DISCLOSURE

Technical Problem

Accordingly, the present invention has been devised to solve the above-mentioned problem, and the present invention intends to provide a waterproof sound-transmitting sheet having improved waterproofing performance, and a method for producing same. Moreover, the present invention intends to provide a waterproof sound-transmitting sheet which can be easily handled.

Further, the present intends to provide a waterproof sound-transmitting sheet, the total thickness which can be easily adjusted.

Technical Solution

In order to accomplish the above objects, an aspect of the present invention provides a waterproof sound-transmitting sheet, which is attached to a sound hole of a case, including: a support layer made of a film-shaped porous material and formed in the case; and a waterproofing layer formed on one side of the support layer in the shape of a porous nanoweb in which fine fiber strands are crosswisely layered and exposed to the outside of the case.

Here, the support layer may be formed of a nonwoven fabric or a mesh layer.

Further, the waterproofing layer may be formed by applying a polymer material onto the support layer using electrospinning.

Further, the waterproofing layer may be made of a material containing polyvinylidene difluoride (PVDF).

The waterproof sound-transmitting sheet may further include: an external support layer made of a film-shaped porous material, formed on one side of the waterproofing layer provided on the other side thereof with the support layer and exposed to the outside of the case.

Another aspect of the present invention provides a method for producing a waterproof sound-transmitting sheet, including the steps of: providing a support layer made of a film-shaped porous material; preparing a spinning solution including a polymer material; and applying the spinning solution to one side of the support layer using electrospinning to form a waterproofing layer, wherein the waterproofing layer is formed in the shape of a porous nanoweb in which fine fiber strands are crosswisely layered.

Here, the support layer may be formed of a nonwoven fabric or a mesh layer.

Further, the polymer material may include polyvinylidene difluoride (PVDF).

The method may further including the step of: forming an external support layer made of a film-shaped porous material on one side of the waterproofing layer provided on the other side thereof with the support layer, after the step of forming the waterproofing layer.

Advantageous Effects

Since the waterproof sound-transmitting sheet according to the present invention is configured to expose a waterproofing layer to the outside of a case, its waterproofing performance can be improved. Further, this waterproof sound-transmitting sheet can be easily handled because a porous support layer is formed on one side of the waterproofing layer.

Further, the total thickness of the waterproof sound-transmitting sheet can be easily adjusted because the waterproofing layer is formed by electrospinning. Therefore, according to the present invention, there is provided a thin waterproof sound-transmitting sheet suitable for a small electronic appliance. Moreover, since the thickness of the waterproof sound-transmitting sheet can be easily adjusted, the air permeability thereof can also be easily adjusted, thus realizing excellent sound characteristics.

BEST MODE

Figure 1:
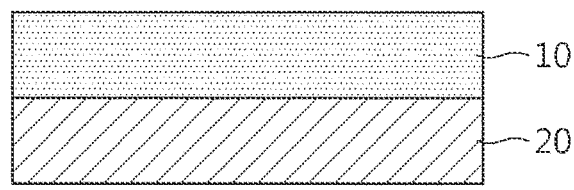
FIG. 1 is a sectional view showing the structure of a waterproof sound-transmitting sheet according to an embodiment of the present invention.

Hereinafter, preferred embodiments of the present invention will be described in detail with reference to the attached drawings. Here, when it is determined that the detailed description of the related art would obscure the gist of the present invention, the description thereof will be omitted. Embodiments of the present invention are provided in order to more clearly explain the present invention to those skilled in the art. Therefore, the shapes, sizes and the like of the elements in the drawing may be exaggerated for more clearly explaining the present invention.

Hereinafter, a waterproof sound-transmitting sheet according to an embodiment of the present invention will be described in detail.

Figure 2:
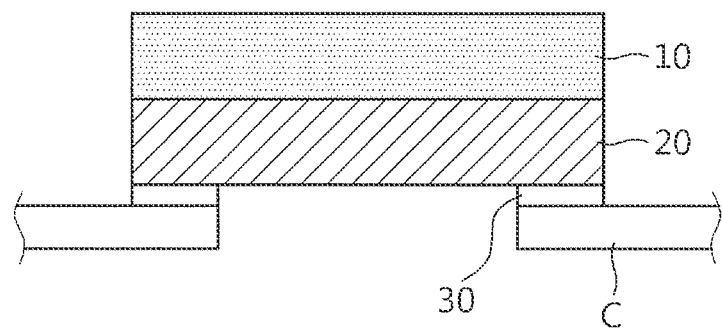
FIG. 2 is a sectional view showing an application example of the waterproof sound-transmitting sheet to a case of an electronic appliance.

FIG. 1 is a sectional view showing the structure of a waterproof sound-transmitting sheet according to an embodiment of the present invention. FIG. 2 is a sectional view showing an application example of the waterproof sound-transmitting sheet to a case of an electronic appliance.

Referring to FIG. 1, the waterproof sound-transmitting sheet 100 according to an embodiment of the present invention includes a support layer 10 and a waterproofing layer 20.

The support layer 10 is a film-shaped porous layer. This support layer 10 may be formed of a nonwoven fabric or a mesh layer. This support layer 10 is relatively strong compared to the waterproofing layer 20, thus easily handling the waterproof sound-transmitting sheet 100. This support layer 10 is formed in a case (C) of an electronic appliance when the waterproof sound-transmitting sheet 100 is connected to the sound hole of the case (C).

The waterproofing layer 20 is formed on one side of the support layer 10 in the shape of a film. Further, the waterproofing layer 20 may be formed in the shape of a porous nanoweb in which fine fiber strands are crosswisely layered. More specifically, the waterproofing layer 20 may be formed by applying a polymer material to one side of the support layer 10 using electrospinning. In this case, the polymer material may include polyinylidene difluoride (PVDF). Further, in the waterproofing layer 20, the surface thereof exposed to the outside may further be oleophobic-treated.

Moreover, the polymer material may include: polyamide, polyimide, polyamideimide, poly(meta-phenylene isophthalamide), polysulfone, polyether ketone, polyether imide, aromatic polyesters such as polyethylene terephthalate, polytrimethylene terephthalate and polyethylene naphthalate, polytetrafluoroethylene, polyphosphazenes such poly-diphenoxyphosphazene and poly{bis[2-(2-methoxyethoxy) phosphazene]}, polyurethane and copolymers thereof, cellulose acetate, cellulose acetate butylate, and cellulose acetate propionate. Further, the polymer material may also include: polyvinylidenefluoride (PVDF), poly(vinylidene-fluoride-co-hexafluoropropylene), perfluoropolymers, polyvinylchloride or polyvinylidenechloride and copolymers thereof, polyethyleneglycol derivatives including polyethyleneglycol dialkyl ether and polyethyleneglycol dialkyl ester, poly(oxymethylene-oligo-oxyethylene), polyoxides including polyethylene oxide and polypropylene oxide, polyvinyl acetate, poly(vinylpyrrolidone-vinylacetate), polystyrene and a polystyrene-acrylonitrile copolymer, polyacrylontrile, a polyacrylonitrile-methylmethacrylate copolymer, polymethylmethacrylate, a polymethylmethacrylate copolymer, and mixtures thereof.

This waterproofing layer 20 is formed by electrospinning, and thus the thickness thereof is easily adjusted. Particularly, the total sound transmitting property of the waterproof sound-transmitting sheet 100 becomes excellent because the thickness of the waterproofing layer 20 is easily decreased by an electronspinning process.

Further, the waterproofing layer 20 is provided on a sound hole of the case (C) of an electronic appliance such that it is exposed to exterior space. That is, when water is externally sputtered into the sound hole of an electronic appliance, the waterproofing layer 20 directly prevents water from being infiltrated into the electronic appliance.

As described above, the waterproof sound-transmitting sheet 100 of the present invention is characterized in that the porous support layer 10 is placed in the case (C) of an electronic appliance to allow this sheet 100 to be easily handled, and in that the waterproofing layer 20 having a porous fiber web structure is exposed to the outside of the case (C) of the electronic appliance to improve the waterproofing performance of this sheet 100.

Meanwhile, the waterproof sound-transmitting sheet 100 may be attached to the case (C) by an adhesion layer 30. In this case, the adhesion layer may be a double-sided adhesive tape formed by applying an adhesive material to both sides of a substrate using electrospinning.

Hereinafter, a waterproof sound-transmitting sheet according to another embodiment of the present invention will be described in detail.

Figure 3:
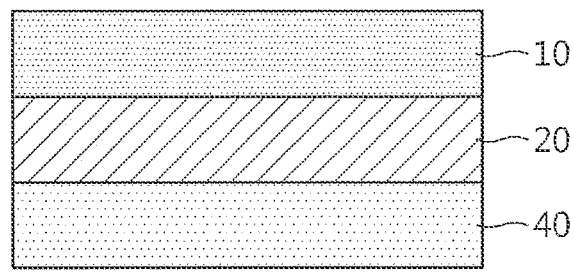
FIG. 3 is a sectional view showing the structure of a waterproof sound-transmitting sheet according to another embodiment of the present invention.

FIG. 3 is a sectional view showing the structure of a waterproof sound-transmitting sheet according to another embodiment of the present invention.

Referring to FIG. 3, the waterproof sound-transmitting sheet 200 according to another embodiment of the present invention includes an external support layer 40, a waterproofing layer 20 formed on the external support layer 40 and a support layer 10 formed on the waterproofing layer 20. In this case, each of the support layer 10 and the external support layer 40 formed on both sides of the waterproofing layer 20 is formed of a material including a nonwoven fabric. That is, unlike the waterproof sound-transmitting sheet 100 of FIG. 1, this waterproof sound-transmitting sheet 200 is a three-layer sheet.

This waterproofing layer 20 is the same as the waterproofing layer 20 of the waterproof sound-transmitting sheet 100 of FIG. 1. That is, the waterproofing layer 20 of FIG. 3 is a porous nanoweb layer formed by applying a polymer material using electrospinning.

The support layer 10 and the external support layer 40 of FIG. 3 serve as the support layer 10 of the waterproof sound-transmitting sheet 100 of FIG. 1. The support layer 10 and the external support layer 40 may be made of different porous materials. Meanwhile, a nonwoven fabric is applied on one side of the waterproofing layer 20, and a porous material, not the nonwoven fabric, is applied on the other side thereof, thus constituting another waterproof sound-transmitting sheet.

Hereinafter, a method for producing a waterproof sound-transmitting sheet according to an embodiment of the present invention will be described.

Figure 4:
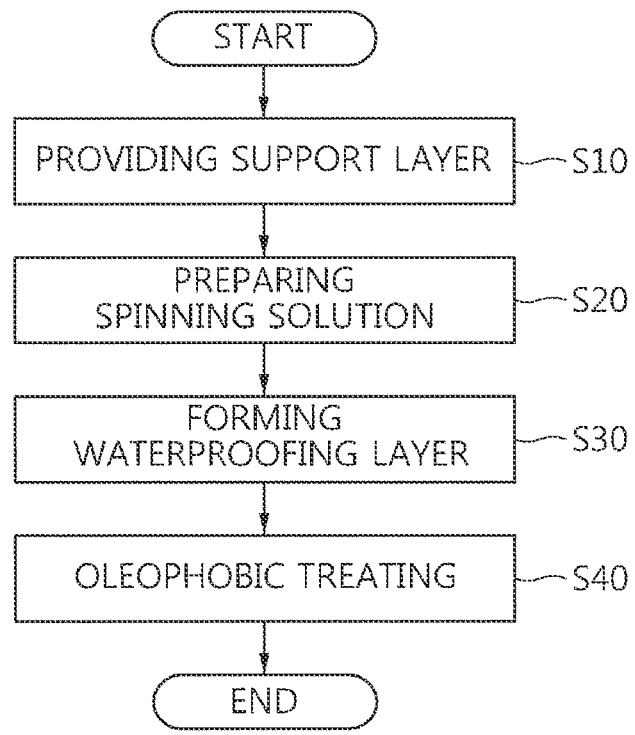
FIG. 4 is flowchart explaining a method for producing a waterproof sound-transmitting sheet according to an embodiment of the present invention.

FIG. 4 is a flowchart explaining a method for producing a waterproof sound-transmitting sheet according to an embodiment of the present invention.

Referring to FIG. 4, in the method for producing a waterproof sound-transmitting sheet according to an embodiment of the present invention, first, a support layer made of a film-shaped porous material is provided (S10). In this case, the support layer may be formed of a nonwoven fabric or a mesh layer.

Then, a spinning solution including a polymer material is prepared (S20). In this case, the polymer material may include polyinylidene difluoride (PVDF).

Thereafter, the spinning solution prepared in step S20 is applied onto the support layer by electrospinning to form a waterproofing layer (S30).

Then, the waterproof sound-transmitting sheet including the support layer and the waterproofing layer is oleophobic-treated (S40).

Thereafter, an external support layer made of a film-shaped porous material may further be formed on one side of the waterproofing layer provided on the other side thereof with the support layer.

Figure 5:
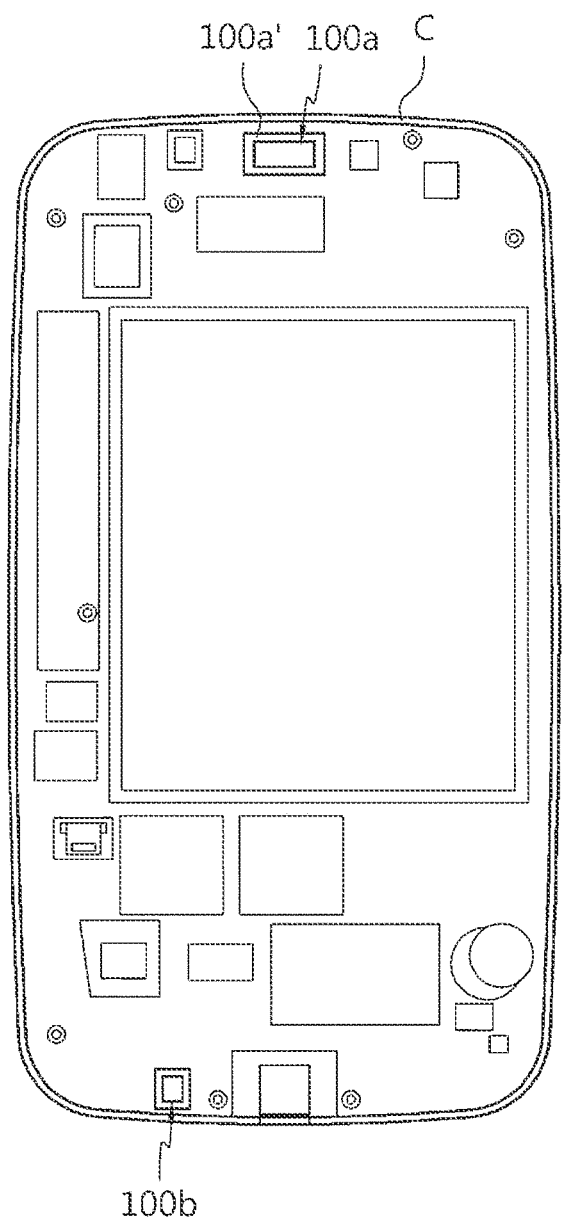
FIG. 5 is a schematic view showing an electronic appliance provided with the waterproof sound-transmitting sheet according to the embodiment of the present invention.

FIG. 5 is a schematic view showing an electronic appliance provided with the waterproof sound-transmitting sheet according to the embodiment of the present invention.

Referring to FIG. 5, the inside of the case (C) of an electronic appliance, that is, a mobile terminal is shown. In the case (C) of the mobile terminal, the waterproof sound-transmitting sheet 100a or 100b according to an embodiment of the present invention is applied to a sound hole, that is, a mike or speaker hole. In this case, a support frame 100a' for supporting a shape may be formed on the circumference of the waterproof sound-transmitting sheet 100a. In FIG. 5, the full lines in the case (C) indicate circuits, eases and the like formed in the mobile terminal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for producing a waterproof sound-transmitting sheet, comprising the steps of:
    applying a spinning solution directly onto one surface of a support layer using electrospinning to form a waterproofing layer, wherein the spinning solution includes a polymer material and the support layer is made of a film-shaped porous material, and
    wherein the waterproofing layer is formed in the shape of a porous nanoweb in which fine fiber strands are crosswisely layered.

2. The method of claim 1, wherein the support layer is formed of a nonwoven fabric or a mesh layer.

3. The method of claim 1, wherein the polymer material includes polyvinylidene difluoride (PVDF).

4. The method of claim 1, further comprising the step of: forming an external support layer made of a film-shaped porous material on one side of the waterproofing layer provided on the other side thereof with the support layer, after the step of forming the waterproofing layer.

* * * * *